United States Patent
Alluri et al.

(10) Patent No.: US 10,382,585 B2
(45) Date of Patent: *Aug. 13, 2019

(54) CONCURRENT CODE APPLICATION IN A STATEFUL COMPUTING ENVIRONMENT

(71) Applicant: International Business Machines Corporation, Armonk, NY (US)

(72) Inventors: Sudhir Alluri, Bangalore (IN); Abhishek Chakraborty, Bangalore (IN); Venkateshwarlu Kachem, Bangalore (IN); Suhas D. Mane, Bangalore (IN); Sumesh K. Naduvalath, Bangalore (IN); Nishant Ranjan, Bangalore (IN); Stephen R. Valley, Valatie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,630

(22) Filed: Oct. 10, 2016

(65) Prior Publication Data
US 2017/0242682 A1 Aug. 24, 2017

Related U.S. Application Data

(63) Continuation of application No. 15/052,380, filed on Feb. 24, 2016.

(51) Int. Cl.
*G06F 11/14* (2006.01)
*G06F 11/34* (2006.01)
(Continued)

(52) U.S. Cl.
CPC ............. *H04L 67/34* (2013.01); *G06F 8/656* (2018.02); *G06F 11/1433* (2013.01);
(Continued)

(58) Field of Classification Search
CPC ............. G06F 11/1438; G06F 11/3433; G06F 11/3495; G06F 2201/865
See application file for complete search history.

(56) References Cited

U.S. PATENT DOCUMENTS 6,961,770 B1 * 11/2005 Ott ........................ H04L 67/22
370/389
9,491,107 B1 * 11/2016 Scudder ................. H04L 47/30
(Continued)

OTHER PUBLICATIONS

List of IBM Patents or Patent Applications Treated as Related; (Appendix P), Filed Feb. 8, 2017, 2016; 2 pages.
(Continued)

*Primary Examiner* — Jigar P Patel
(74) *Attorney, Agent, or Firm* — Cantor Colburn LLP; Steven Chiu

(57) ABSTRACT

Embodiments herein relate to a master process being executed by a processor to control an upgrade to an application process. For instance, the master process initializes an environment for operating an application process and starting an execution of the application process within the environment. Further, the master process upgrades a code of the application process while the master process maintains the environment and the execution of the application process.

6 Claims, 6 Drawing Sheets

(51) Int. Cl.
*G06F 8/656* (2018.01)
*H04L 29/08* (2006.01)

(52) U.S. Cl.
CPC ...... *G06F 11/1438* (2013.01); *G06F 11/3433* (2013.01); *G06F 2201/85* (2013.01)

(56) References Cited

U.S. PATENT DOCUMENTS

| | | | |
|---|---|---|---|
| 9,626,228 B1* | 4/2017 | Walia | G06F 9/52 |
| 2004/0249812 A1* | 12/2004 | Scoredos | G06F 17/30362 |
| 2008/0301488 A1* | 12/2008 | Clark | G06F 11/142 |
| | | | 714/4.1 |
| 2009/0037550 A1* | 2/2009 | Mishra | G06F 9/485 |
| | | | 709/208 |
| 2014/0020049 A1* | 1/2014 | Smith, III | G06F 21/121 |
| | | | 726/1 |
| 2015/0312352 A1* | 10/2015 | Shamilian | H04L 67/141 |
| | | | 726/6 |

OTHER PUBLICATIONS

Sudhir Alluri et al., "Concurrent Code Application in a Stateful Computing Environment", U.S. Appl. No. 15/052,380, Feb. 24, 2016.

* cited by examiner

CONCURRENT CODE APPLICATION IN A STATEFUL COMPUTING ENVIRONMENT

DOMESTIC PRIORITY

This application is a continuation of and claims priority from U.S. patent application Ser. No. 15/052,380, filed on Feb. 24, 2016, entitled "CONCURRENT CODE APPLICATION IN A STATEFUL COMPUTING ENVIRONMENT", the entire contents of which are incorporated herein by reference.

BACKGROUND

The present disclosure relates generally to a concurrent code application in a stateful computing environment.

In general, network availability is a major concern and issue in public and private networks. Network availability can be sustained through monitoring and applying network updates (e.g., patches, fixes, and new functions); however, network updates themselves can make network resources unavailable. Generally, an unavailable network resource costs a customer and/or a business time, personnel resources, and money. Further, contemporary implementations of open source networks increase these costs due to network engineers being at the mercy of unclear fixes and distribution patterns when updating open source network resources.

SUMMARY

Embodiments include a method, system, and computer program product for executing a master process to control an upgrade to an application process. For instance, the master process initializes an environment for operating an application process and starting an execution of the application process within the environment. Further, the master process upgrades a code of the application process while the master process maintains the environment and the execution of the application process.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter described herein is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Figure 1:
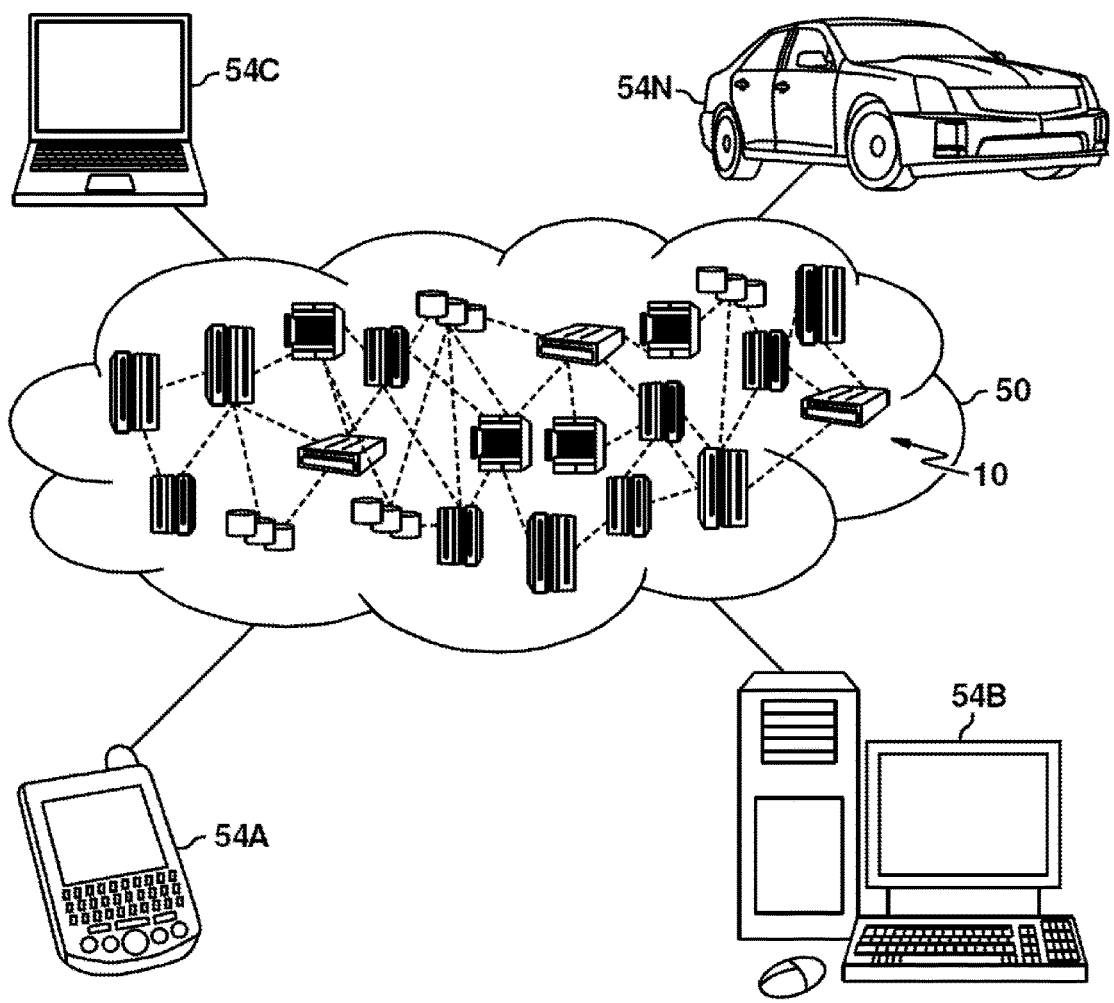
FIG. 1 depicts a cloud computing environment according to an embodiment.

Embodiments described herein relate to applying code patches, fixes, and new functions to network resources in real time, with no interruption in service. That is, embodiments described herein can be implemented via a method, system, and/or computer program product that provides a secure, fault tolerant operation to replace code (e.g., application or firmware) in a network software environment while maintaining 24/7 uptime and availability for customers and/or businesses.

For example, embodiments herein provide network availability associated with keeping socket connections alive peer-to-peer (e.g., between internal clients, such as local to a virtualized system, external clients, such as external across a local area network, or combination thereof). The socket connections or fittings can be saved across a transmission control protocol (TCP) connection to enable a loading of code underneath the socket connections. Thus, by utilizing embodiments herein, a loading of code to both first and second applications in communication via a TCP connection can be performed on-the-fly without interrupting or losing the TCP connection. In turn, embodiments herein deliver improved functionality through the loading of code while keeping network connectivity alive across a socket domain.

It is understood in advance that although this disclosure includes a detailed description on cloud computing, implementation of the teachings recited herein are not limited to a cloud computing environment. Rather, embodiments herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
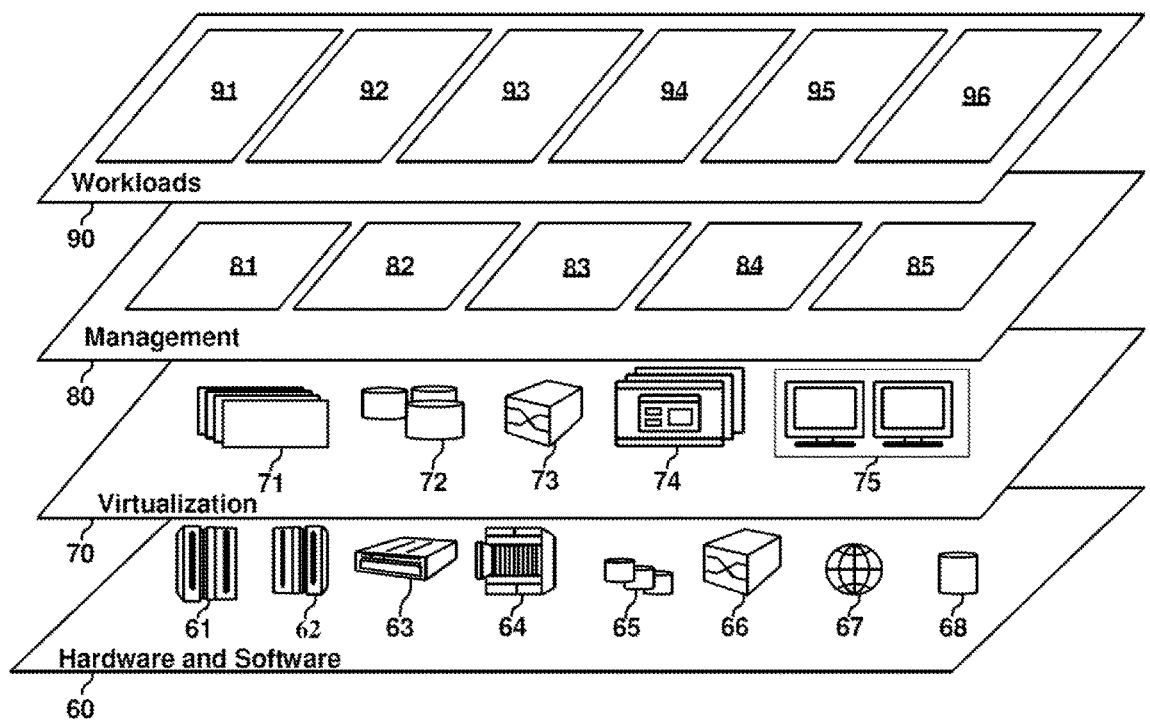
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments herein are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

As noted above, embodiments described herein relate to applying code patches, fixes, and new functions to network resources in real time, with no interruption in service. To perform the code patches, fixes, and new functions in real time, with no interruption in service, a master process can be employed that will create/start an application process with a required set of parameters. In this way, the master process will open and keep socket file descriptors on behalf of the application process, instead of the application process opening its own network sockets. In turn, the application will receive the session data using any inter-process communication (IPC) control socket. Note that in the case of a concurrent patch, a standby version of the application can be started by the master process. Further, encrypted SSL sessions can be maintained by the master process via the OpenSSL libraries and a secure socket call, and the application process can get unencrypted data.

In operation, when a new version of an application primes, the application can register to the master process, which will identify it as in "standby" mode; give "standby-ready" message after its initialization is complete; accept new client sessions as well as switched sessions; and, once the switch is complete, can become an "active" process. In case of an application process concurrent patch no session will be dropped. In addition, when replacing the master process, the system will wait until all session are quiesced (i.e., temporarily disabled) before attempting the switchover.

Figure 3:
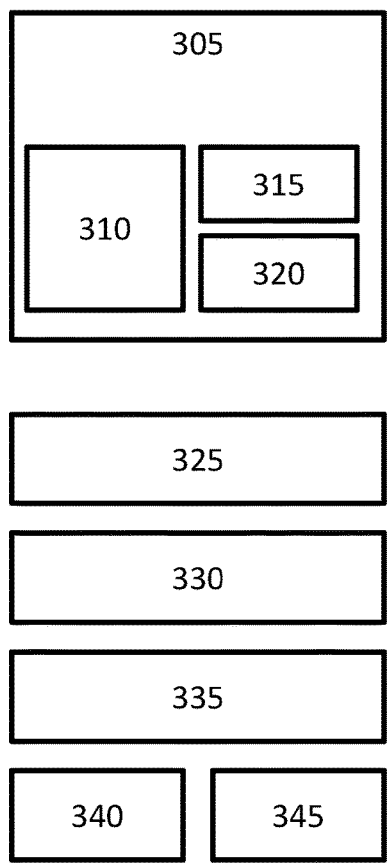
FIG. 3 depicts a system for executing master and application processes in accordance with an embodiment.
Figure 3:
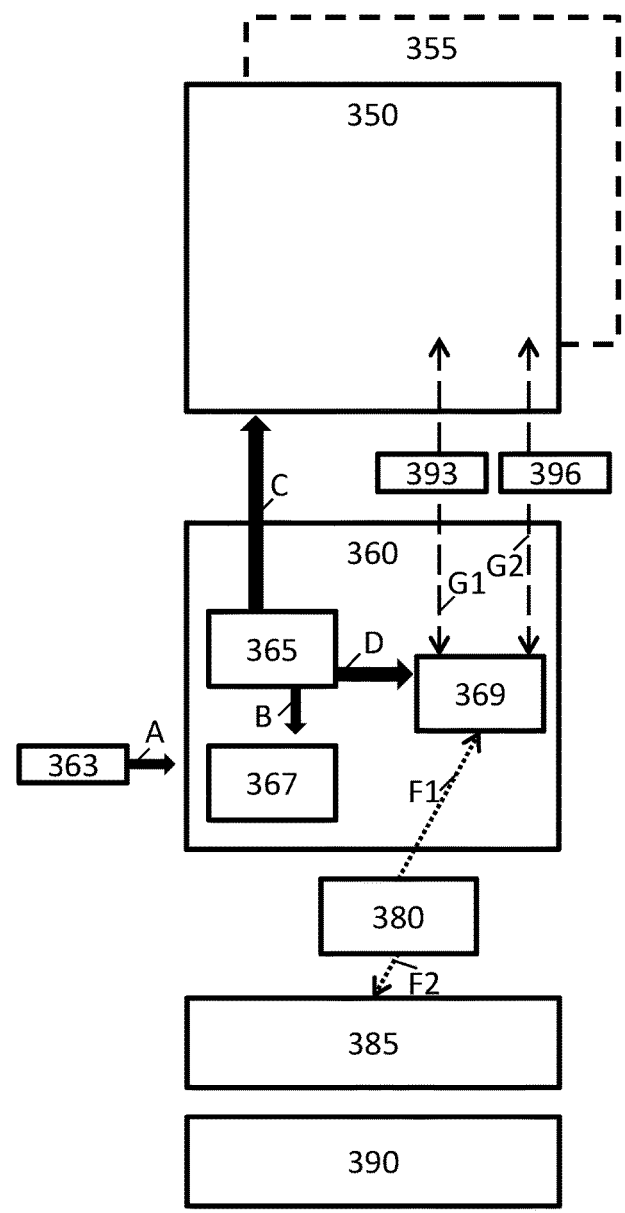

Turning now to FIG. 3, a system 300 is generally shown in accordance with an embodiment. The system 300 provides a secure, fault tolerate diagram example of fully replacing code (e.g., application or firmware) in a network software environment running transmission control protocol/internet protocol (TCP/IP) and network sockets. In turn, the system 300 maintains an the entire code functionality (e.g., in the Linux userspace); maintains the TCP client connections alive during a concurrent-patch; determines whether the system 300 does not have to re-boot the Linux-kernel unless there's a catastrophic error like a hardware or kernel issue; supports secure connections; and provides designed-in fault tolerance.

The elements of the system 300 include, but are not limited to, memory regions 305, a shared memory block 310, a trace flag 315, a log 320, memory map interface 325, a hardware library interface 330, a hardware architecture 335, a control area 340, a management area 345, a first firmware version 350, a second firmware version 355, a master process 360, a start-up command 363, an initialization 365, a recovery process 367, a socket master 369, a new socket 380, a TCP/IP link 385, a local area network driver 390, a data system data signal 393, and data system control signal 396. These elements will now be described.

On the hardware side, the memory regions 305 can include the shared memory block 310, the trace flag 315, and the log 320. Examples of the memory regions 305 include local programming stores (LPS), local data stores (LDS), and non-cache LPS. The memory map interface 325 can be allocated and segregated into shared-memory segments. The memory map interface 325 can be a shared memory or table that manages all the memory location necessary by all processes. Thus, the memory accesses can have the characteristics of shared memory available across multiple processes (i.e., the master process 360 and any application processes), accessibility for updating without disrupting the TCP-client connections and relevant states, local buffers or date not-required during a concurrent-patch for memory that resides inside Linux (e.g., malloc( ) calls, static array allocations, etc.), and sharing across dependent/independent processes (e.g., shared-memory-segments).

For example, the memory map interface 325 can be a look-up table to find stateful information, stateless information, TCP information, channel block information, operating system specific information, etc., each of which are shared across the master process 360 and any application processes. Use, access, and management of the shared-memory segments can be carried out by shared memory application programmable interfaces (APIs) listed in the Table 1.

TABLE 1

Example List of Shared Memory APIs

| Command | Details |
|---|---|
| shm_open(3); | Create and open a new object, or open an existing object. The call returns a file descriptor for use by the other interfaces listed below |
| Ftruncate(2) | Set the size of the shared memory object. A newly created shared memory object can have a length of zero. |
| mmap(2) | Map the shared memory object into the virtual address space of the calling process. |
| munmap(2) | Unmap the shared memory object from the virtual address space of the calling process. |
| shm_unlink(3) | Remove a shared memory object name. |
| close(2) | Close the file descriptor allocated by shm_open(3) when it is no longer needed. |
| fstat(2) | Obtain a stat structure that describes the shared memory object. Among the information returned by this call are the object's size (st_size), permissions (st_mode), owner (st_uid), and group (st_gid) |
| fchown(2) | To change the ownership of a shared memory object. |
| fchmod(2) | To change the permissions of a shared memory object. |
| msync( ) | To flush changes made to the in-core copy of a file that has been mapped into memory using mmap(2) back to disk - use of msync( ) is recommended as required. |

In view of table 1, the system 300 can perform mapping memory by executing the shm_open( ) command to create the memory node device file (e.g., /dev/rcb) from the application. The system 300 can then execute the mmap( ) command on a returning a file descriptor and pass parameters of like size and permissions. A returning virtual address pointer is then used to write or read corresponding memory area. When the mmap command is issued from the application, the devmap driver's mmap file operations are invoked. These operations call a remap_pfn_range( ) command and utilize start address and size to map. A device control register (DCR) bus of the system 300 is accessed via ioctl processes from the userspace. The devmap driver's ioctl file operations function implements mfdcr( ) and mtdcr( ) assembly macros to access DCR registers.

The hardware library interface 330 can be a table that manages credentials of the hardware architecture 335 of the system 300. The hardware architecture 335 can be any hardware configuration capable of running an operating system of the system 300. Further, the hardware library interface 330 can expose APIs for accessing resources provided by the hardware architecture 335. The control area 340 and the management area 345 support the operations of the hardware architecture 335.

On the software side, the first firmware version 350 and the second firmware version 355 execute, along with the master process 360. The first and second firmware versions 350, 355 can be any type of software that provides control, monitoring and data manipulation of the system 300 and its component part.

The master process 360 is a native process to an operating system of the system 300 that maintains the infrastructure to support peer-to-peer sockets, to manage how application processes get dispatched. For instance, the master process 360 opens and maintains all network sockets for an application and gracefully switches the application to standby, opens TCP sockets with or without security to external clients, and maintains socket connections during changing or updating the code. In turn, the master process 360 manages all the catastrophic issues that could happen while running a piece of equipment or software, such as the first and second firmware versions 350, 355.

The master process 360 is a stateful process. A stateful process is a process that utilizes a file descriptor that describes a socket application so that the socket application is well known to the process itself. In an example operation, the master process 360 can be triggered by a Linux script named startup.sh that executes on kernel boot. The master process 360 can perform recovery and logging during a catastrophic error, perform signal handling for a code process, start applications that contain a socket based application (e.g., start an application process, such as by creating the environment in which the application process can operate and be dispatched and be restarted), and handle TCP/IP connections and keeps a client alive during a concurrent-patch.

With regard to error recovery, the master process 360 can recover catastrophic software errors and hardware errors. A catastrophic software error is an error that cause to application process to slow, communicate intermittently, terminate, or fail. Error handling is similar to concurrent patch, where the master process 360 handles the appropriate signal, logs the error, restarts the application process, and transitions all sessions from the failing process to the new process. Note that the application process can recover software errors, where a log will be generated and a recovery action performed. Examples of errors include, but are not limited to, when a child process stops or terminates; an invalid memory access, segmentation fault, external interrupt, an alarm system call.

The master process 360 can include multiple threads, such as control threads and session threads (e.g., respectively, the data system control signal 396 and the data system data signal 393, as indicated by arrows G2, G1). The control thread can perform all management related activities and will manage all listening sockets. The control thread include, but are not limited to, opening the well know domain socket server on which process will register; listening for all TCP connections, processing all control messages (e.g., switchover control message); and starting/stopping the application process. The session threads can "select" field descriptors, such as an active internal field descriptor and a network field descriptor. The session threads can read data from one field descriptor and write to the other. Because there is generally one thread per active session, when a session is disconnected the corresponding session thread will be destroyed.

In addition, the master process 360 supports software redundancy (concurrent patch) and Application upgrade by starting the newly downloaded process. For instance, a first master process of a first piece of equipment/software has a table in shared memory where it manages socket connections peer-to-peer with another master process of another piece of equipment/software. The application process utilizes the socket connections so that communication will happen on the application process level through the master processes. If the application process fails in any way, the master process will tend to the failure and restart the application process while maintaining the socket connections (e.g., maintaining constant connectivity).

In an example, the application process manages the signal handling of the socket connections utilizing a set of commands, such as interrupts and the like. Yet, in case of a catastrophic error on the application level, the master process 360 will step in and manage the connectivity and the signal handling. In operation, when the application process catastrophically fails, a signal is generated that the master process 360 catches. The master process 360 then determines what to do with that signal, where responsive actions include but are not limited to restart the application code, restart the hardware, etc.

The first and second firmware versions 350, 355 can use TCP, can sockets, and execute application processes. These application processes are stateless, which permits code management or change (e.g., management of the corresponding firmware) and are outside of the hardware configuration of the system 300. A stateless process is a process that utilizes a handle to the process, where the handle can change or be upgraded without regard to the underlying principles of the stateful process/application. Thus, an application process can be started by the master process 360 and can be responsible for all code operational aspects.

In general, networking functionality is provide by the application process, with the exception of error recovery (process restarting) being supported by the master process 360. With respect to TCP communication, the application process communicates with the master process 360 over the socket master 369 (e.g., a domain socket interface). Note that two types of domain sockets can be used for communication; a control socket and a domain socket. The control socket includes control message communications used for application process management calls (and is represented by the data system control signal 396). The data Socket handles TCP traffic (and is represented by the data system data signal 393). At any given time, the application process has one Control socket and 'n' data socket(s), where N is the number of TCP clients connected to the application (e.g., first firmware version 350).

An application (e.g., the first and second firmware versions 350, 355) can use device nodes to access and map various memory areas to a userspace, such as those itemized in Table 2.

TABLE 2

Device Nodes Implemented to Access the devmap driver

| Node | Major/Minor | Method/area |
|---|---|---|
| dev/rcb | 253/0 | mmap/ |
| dev/lds | 254/1 | mmap/ |
| dev/lps | 254/2 | mmap/ |
| dev/nclps | 254/3 | mmap/ |
| dev/dcr | 254/4 | ioctl/ |
| dev/logger | 254/5 | . . . |

Note that the memory map interface 325 and the hardware library interface 330 are separated from the application processes and provided in shared object libraries. Further, these two libraries are used in combination to enable the operation of these processes. These shared libraries can be dynamically loaded and unloaded to support changes to these processes and routines. That is, during a software/firmware update, the concurrent patch support can start a new application process and move all active sessions from an existing application process to that newly started process. During a catastrophic error, which cannot be patched or recovered, the master process 360 can be responsible for logging and recovery. In some embodiments, it can be assumed that the master process 360 will not end unexpectedly; yet, in the case when it does, the system 300 can take an exception and be re-booted.

With respect to communication between the master process 360 and an application process, a message format may include a format according to Table 3 and Message Format. Note that during communication with the master process 360, an application module index (AMI) will remain the same for packets sent and received.

TABLE 3

Description of Message Format

| Field | Description |
|---|---|
| i32Ami | Application Module Index (AMI) is a unique number identifying Application returned at time of registration. |
| u32Type | Operation Type dentifies what operation needs to be done. |
| u32Len | Length of data following not including this header. |
| ai8Data | the field ai8Data can be a dummy field. Based on the type (u32Type) it can be type-casted to any of the msg specific structures. |

```
Message Format:
    typedef struct
    {
        int32 i32Ami;
        ENmsgType u32Type;
        uint32 u32Len;
        int8 ai8Data[0];
    }
    STmsgHdr;
```

Further, the message format is an interactive message design where the master process 360 can run a "domain socket" server with a 'well known' name (well known to the application processes). Any Linux process, i.e., application process, coming up that wants to open a socket will register itself to the master process 360.

To register to the master process 360, an application process can connect to a domain socket server on the 'well known' name and send a message with ab "app-name", which identifies the process uniquely. This name will be used to correlate active and standby applications. For example, see Table 3 and Registration Format.

TABLE 3

Description of Registration Format

| Field | Description |
|---|---|
| u16MaxSess | Maximum number of sessions supported by the Application |
| ai8ModName | Module name. Unique name identifying the application. Remains same for active and standby |
| ai8DomSockName | Domain socket server name for the instance of the application |
| i32Role | Not to be filled in Request. In the response it tells whether the application is active or standby. |

```
Registration Format:
    AMI = −1
    Op Type = SOCK_M_REGISTER
    Length = sizeof(STregReq)
    typedef struct
    {
        uint16 u16MaxSess;
        int8 ai8ModName[MAX_MOD_NAME_LEN];
        int8 ai8DomSockName[MAX_DOM_SOCK_NAME_LEN];
        int32 i32Role;
    }
    STregReq;
```

The master process 360 can send a response acknowledging registration. The AMI in the response is the AMI for the registering the Application process and can be sent in any further communication. Active and standby processes can get the same AMI. For example, the Response Format is the same except as the Registration format except AMI contains a valid AMI returned and within the structure the 'I32Role→' indicates whether the application instance is active or standby.

If a name supplied in registration (e.g., ai8ModName) doesn't match any other name then a new entry is created by the master process 360 and the registering application is considered active. If the name supplied matches and existing entry then the same index is returned as AMI and the registering process is considered as standby. To register to the master process 360, an application process can send a deregistration message. For example, see the Deregistration Format.

```
Deregistration Format:
    AMI = AMI of Application
    Op Type = SOCK_M_DE_REGISTER
    Length = 0
```

If the deregistering the application process is in standby mode, then all field descriptors will be closed. If the deregistering the application process is in active mode, then all field descriptors of this instance will be cleared. A pending process in standby mode will be made active. The same behavior can be utilized if a registering socket closes.

Regarding opening and closing a socket, the master process 360 communicate with the application process to determine a socket status. For instance, to open a listen socket, an "active" application can use Table 4 and Open Socket Format.

TABLE 4

Description of Open Socket Format

| Field | Description |
|---|---|
| u32V4Addr | Ip address in 4 byte format |
| i32FdIndex | Send as −1 in request. On successful open of listen socket, the reply will contain a non-negative number, else −1. |
| u16Port | Port number for listen socket. |
| i8IsSec | This will tell whether ssl is to be used while making connections. |

```
Open Socket Format:
    AMI = AMI of Application
    OP Type = SOCK_M_OPEN_LIST_SOCK
    Length = sizeof(STopenListSock)
    typedef struct
    {
        uint32 u32V4Addr;
        int32 i32FdIndex;
        uint16 u16Port;
        int8 i8IsSec;
        int8 i8Rsvd;
```

-continued

```
}
STopenListSock;
```

The response for the Open Socket Format can have i32FdIndex changed on success or else it will remain as −1. To close this listen socket, the i32FdIndex returned can be saved as this is the key when closing the socket.

On successful opening of the socket the master process 360 can associate the listening field descriptor to an AMI. Once a peer connects, a connect signal can be sent to the domain socket for the active process for this AMI, a message can be sent by the master process to Application indicating a session identification, any message received on network socket can be sent to domain socket (e.g., the socket master 369 of the master process 360). Further, if any socket disconnects (TCP or domain socket), the other socket is also disconnected. The closing a listen socket can be initiated by an "active" application, and the master process 360 can close the listening socket. For example, see Table 5 and New Domain Socket Format. Further, see Table 6 and Close Socket Format

TABLE 5

Description of New Socket Domain Format

| Field | Description |
| --- | --- |
| u32SessId | Session id associated with the new domain socket connection. |
| u32AppSessIndx | Application session index informed via SOCK_M_APP_SESS_INDX (see below). For new sessions it is −1. |

```
New Socket Domain Format:
    AMI = AMI of Application
    OP Type = SOCK_M_NEW_SESS
    Length = sizeof(STnewSess)
    typedef struct
    {
        uint32 u32SessId;
        uint32 u32AppSessIndx;
    }
    STnewSess;
```

TABLE 6

Description of Close Socket Format

| Field | Description |
| --- | --- |
| i32FdIndex | Fd index returned while opening the socket. |

```
Close Socket Format:
    AMI = AMI of Application
    OP Type = SOCK_M_CLOS_LIST_SOCK
    Length = sizeof(STclosListSock)
    typedef struct
    {
        int32 i32FdIndex;
    }
    STclosListSock;
```

With respect to a client transfer from an active application process to standby (e.g., concurrently patched) process, the switchover can occur session by session. For example, see Table 7 and Switchover Format.

TABLE 7

Description of Switchover Format

| Field | Description |
| --- | --- |
| I32SwOvRes | Result of start switch over. Ignored in request. |

```
Switchover Format:
    AMI = AMI of Application
    OP Type = SOCK_M_START_SW_OV
    Length = sizoef(STstartSwOv)
    typedef struct
    {
        int32 i32SwOvRes;
    }
    STstartSwOv;
```

A response message for the Close Socket Format can contain the values of i32SwOvRes, SW_OV_STARTED (e.g., everything is successful), and STDBY_NOT_THERE (e.g., no standby Application has registered). When response message is received, the listening socket is switched-over, but no sessions are switched. Because of this, any new session that is started will go to the new application.

After the switchover, the active application process can send a new session message for each session. For example, see Table 8 and New Session Format.

TABLE 8

Description of New Session Format

| Field | Description |
| --- | --- |
| i32SwOvRes | Result of session switch over. Ignored in request. |
| u32SessId | Session-id to switch-over. |

```
New Session Format:
    AMI = AMI of Application
    OP Type = SOCK_M_SESS_SW_OVER_SESS
    Length = sizeof(STsessSwOv)
    typedef struct
    {
        int32 i32SwOvRes;
        uint32 u32SessId;
    }
    STsessSwOv;
```

Note that a response message to the new session message has as similar format, where the following field are seen: i32SwOvRes includes valid values, such as SESS_S-W_OV_NOT_DONE (e.g., switch-over not successful) or SESS_SW_OV_DONE (e.g., switch-over successful).

After all sessions are switched-over the active application process deregisters itself. If after a timeout this does not happen, the master process 360 can terminate the application process and make the standby process active. All domain socket connections for this process can be closed. For example, see Batch Format.

```
Batch Format:
    typedef struct
```

```
{
    int32 i32SwOvRes;
    uint32 au32SessIdList[0];
}
StsessSwOvList;
```

The Batch Format structure is used to send a list with format s1-s2, s3-s4, where sessions from s1 to <s2 will be switched to s3<s4. For example, if all sessions from 2 to 47 and 75 to 105 are to be moved, then following numbers have to be sent: 2, 48, 75, 106. Note that a session identification is an application's session identification, which is reported to the master process 360 using Session Identification Format.

```
Session Identification Format:
    AMI = AMI of Application
    OP Type = SOCK_M_APP_SESS_INDX
    Length = sizeof(STappSessIndx)
    typedef struct
    {
        uint32 u32AppSessIndx;
        uint32 u32SessId;
    }
    StappSessIndx;
```

The master process 360 can also employ an abort during phased switch-over to standby application. This switchover will happen session by session according to an Abort Message Format.

```
Abort Message Format:
    AMI = AMI of Application
    OP Type = SOCK_M_SW_OV_ABORT
    Length = 0
    No response required.
```

When this message is received the domain socket association with the listen socket and whatever sessions that have been switched over will be switched back. Any new sessions in standby state created during this time will be connected to the active application.

Figure 4:
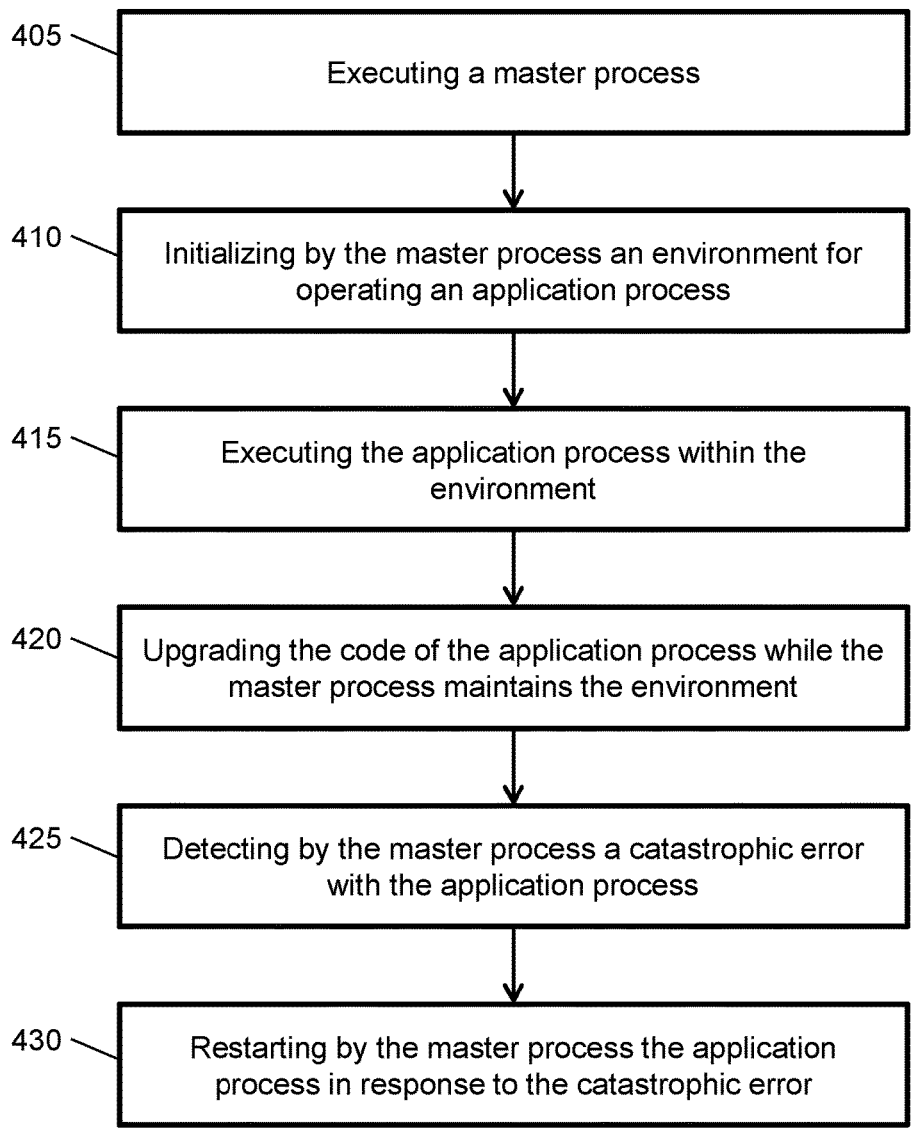
FIG. 4 depicts a process flow for executing master and application processes in accordance with an embodiment.
Figure 5:
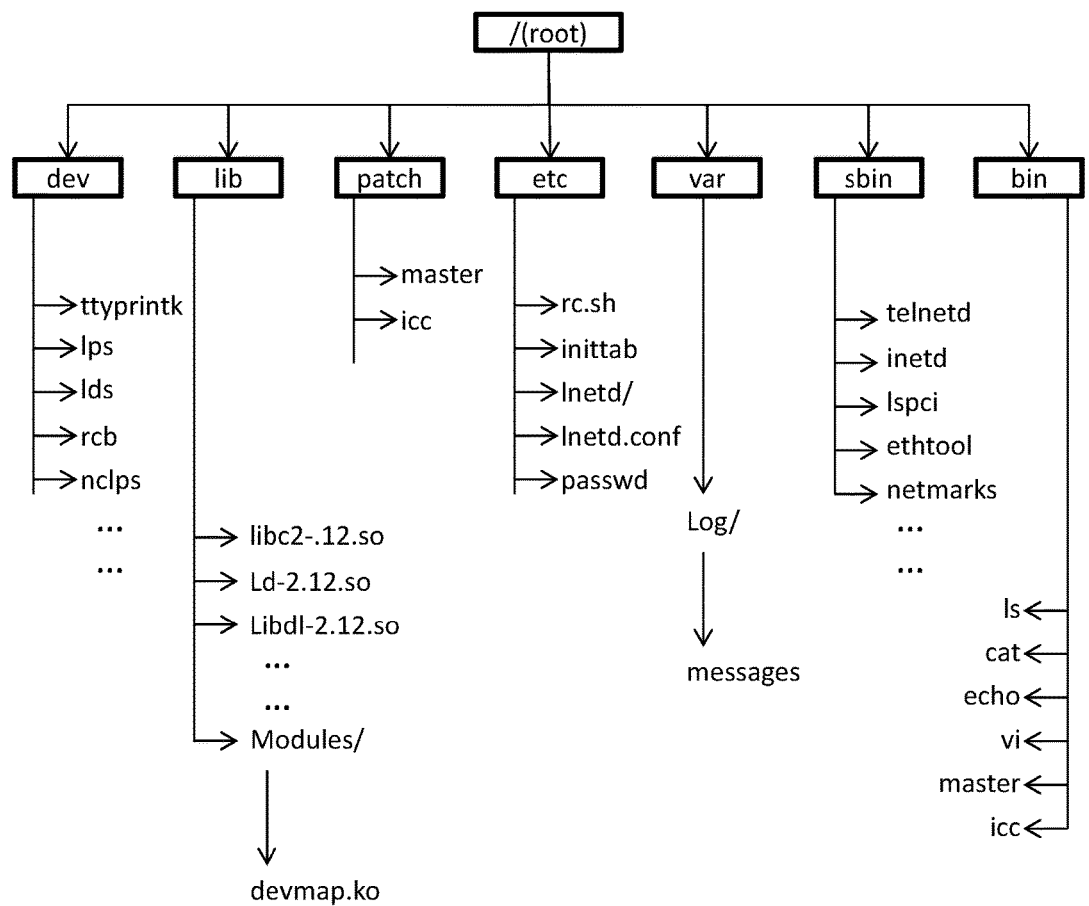
FIG. 5 depicts an example root file system in accordance with an embodiment.

Turning now to FIG. 4, a process flow 400 illustrating an example operation of the system 300 will now be described in accordance with an embodiment. The process flow 400 begins at block 405, where the system 300 executes a master process 360. To execute the master process 360, the start-up command 363 can be received (as indicated by arrow A) by an operating system (or software side) of the system 300. In turn, at block 410, the master process 363 initializes an environment for operating an application process.

To initialize the environment, a common code of the system 300 can perform basic initialization and pass program control to a functional code. The functional code completes the initialization including memory allocations and local control interface processing. Further, a B_loop( ) command in the functional code is entered and a polloop( ) command is called. The polloop( ) command never returns unless a catastrophic error occurs.

Figure 6:
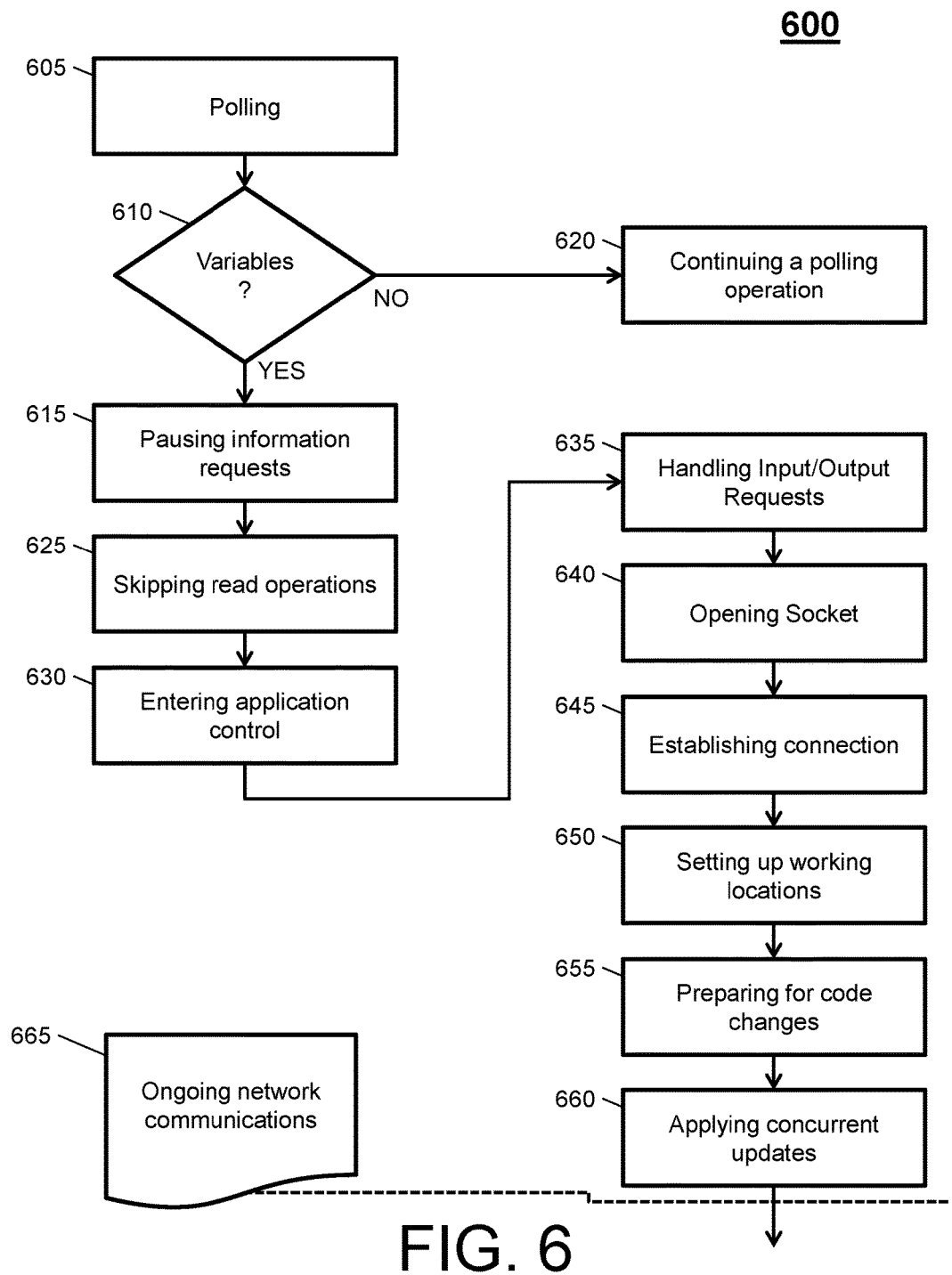
FIG. 6 depicts another process flow for executing master and application processes in accordance with an embodiment.

In an embodiment, once Linux boots up, the common code cannot be re-entered. An exception is during a catastrophic error that will ultimately lead to recovery and the system 300 reboot. To address these issues with initialization, the system 300 can issue a channel reset to a host from the common code. In turn, the system 300 performs a Boot Linux and completes the rest of initialization from inside Linux/functional code (note that the input/output can increase the time for local control interface to handle the extended time it takes to boot Linux and proceed to user-space). Note that there are different phases of application initialization after the Boot Linux, such as a start the master process 360 phase and a start the application process by the master process 360 phase. Thus, after Linux has booted successfully, it can look for and call an 'init' process. The '/sbin/Init' process can look for '/etc/inittab', which can run the '/etc/startup.sh' script. "Start.sh" script can do the relevant devmap memory driver initialization, configuration changes etc. A "memory.cfg" file can list the memory division for the 256 MB of memory lying outside linux. The script can parse this cfg file and can map the devmap driver initialization accordingly. The script can then start the master process 360. The "/etc/startup.sh" script can include parsing "memory.cfg" file; executing Init devmap driver (using insmod); creating all device nodes (lps, lds, rcb, ncLPS etc.) with memory layout to be determined by the system 300, perform configuration changes (if required) like setting system limits, and starting the master process 360. In view of this embodiment, FIG. 6 illustrates an example of a root file system 600 according to an embodiment.

In addition, blocks 405, 410 can be considered part of a boot flow operation of the system 300. An example of a boot flow is upon reset, a boot code sets up the basic hardware and memory map. Once hardware initialization is over, the Linux kernel is loaded. For instance, as shown in FIG. 3, the master process 363 performs an initialization 365. The Linux kernel's peripheral component interconnect (PCI) subsystem scans the PCI bus and tries to find any slave device on it. When an adapter is found, the appropriate driver is called to initialize the adapter. This initialization 365 can trigger the recovery process 367 (as indicated by arrow B), if the application process experienced a catastrophic error, or can trigger a signal to the first and/or second firmware versions 350, 355 to start a new application process (as indicated by arrow C). In the either case, the process flow 400 proceeds to block 415.

At block 415, the system 300 executes an application process within the environment. For instance, the master process 363 utilizes the socket master 369 (as indicated by arrow D) to create the new socket 380. The new socket 380 enables the TCP/IP link 385 for be established for the application process in accordance with credentials of the local area network driver 390 (as indicated by arrows F1, F2). Once the TCP/IP link 385 is established, the master process 363 can monitor the progress of the TCP/IP link 385 and the application process through the data system data signal 393 and the data system control signal 396 (as indicated by arrows G1, G2).

At block 420, the system 300 upgrades the code of the application process while the master process maintains the environment. At block 425, the system 300 detects by the master process a catastrophic error with the application process. At block 430, the master process 360 of the system 300 restarts the application process in response to the catastrophic error. When restarting the application process, the system 300 uses several unique area of memory to perform its operations. For example, memory mapping for various software modules can be found in Table 9.

TABLE 9

Memory Map for Linux and Application Code

| Area | Remarks |
| --- | --- |
| Total available memory | System Dependent |
| Recovery Control Block | Application Recovery Area |
| LPS | Application Space - Shared memory |
| LPS | Application Space - not shared memory |
| Linux OS | Kernel Space |

In view of the above, another example operation of the system 300 will now be described where the master process 360 can be concurrently patched when there are no active sessions, i.e., TCP Clients connected to the application. For instance, the application process can send a control message to the master process 360 (e.g., the start-up command 363), to inform the master process 360 that it must be patched. The master process 360, upon receiving this message, can terminate the application process, copy the master process 360 binary to the designated location, and perform an execution operation to overlay itself. The application process and any sockets necessary would then be restarted. Further, the master process 360 can start the application patch process from the location provided by active the application process. After the upgrade is successful, the master process 360 can over-write the application executable at the default location with the new one.

Turning now to FIG. 6, a process flow 600 by the system 300 will now be described according to an embodiment. The process flow 600 begins at block 605, where the system 300 preforms polling. The polling can include the polloop( ) command by the master process 360 that searches for catastrophic errors. The master process 360, at decision block 610, based on the polling determines if variables indicate a catastrophic error.

If the returned variables indicate that there is a catastrophic error, then the process proceed to block 615 (as indicated by the 'YES' arrow). Otherwise, the process proceed to block 615 (as indicated by the 'YES' arrow) and the master process 360 continues polling operations. For example, if a POR=1 and Standby=0, then the process proceed to block 615 (as indicated by the 'YES' arrow). Otherwise, the process proceed to block 615 (as indicated by the 'YES' arrow) and the master process continues polling (e.g., poll_loop( ) operation).

At block 615, the master process 360 pauses information requests, such as by informing a hos that any input/output request are no longer being accepted. At block 625, the master process 360 proceeds with skipping read operations. At block 630, the master process 360 proceeds with entering application control. At block 635, the master process 360 proceeds with handling input/output requests. At block 640, the master process 360 proceeds with opening a socket. At block 645, the master process 360 proceeds with establishing a connection. At block 650, the master process 360 proceeds with setting up working locations. At block 655, the master process 360 proceeds with preparing code for changes. At block 660, the master process 360 proceeds with applying concurrent updates. Note that once the concurrent updates are applied, the master process 360 proceeds with ongoing network communications at block 665.

Technical effects and benefits providing a secure, fault tolerant operation to replace code (e.g., application or firmware) in a network software environment while maintaining 24/7 uptime and availability for customers and/or businesses). Thus, embodiments described herein are necessarily rooted in system to perform proactive operations to overcome problems specifically arising in the realm of application connectivity (e.g., these problems include unclear fixes and distribution patterns when updating open source network resources, resulting in unwanted costs and expenses). Further, the technical effects and benefits includes no special hardware to perform the operation of the system and no dependencies on future versions of application code, along with providing an encrypted/secure TCP flow as needed.

The embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    initializing, by a master process executed by a processor coupled to a memory, an environment for operating an application process;
    starting, by the master process, an execution of the application process within the environment;
    upgrading, by the master process, a code of the application process while the master process maintains network connectivity between the environment and the execution of the application process, wherein the network connectivity exists in a socket domain, wherein the master process opens one or more network sockets and keeps socket file descriptors on behalf of the application process, wherein the application process does not open the one or more network sockets, wherein the one or more network sockets comprises a control socket for exchanging control messages with the application process and a data socket for transmitting data;
    detecting, by the master process, a catastrophic error with the application process, wherein the detection is performed by polling variables to determine the catastrophic error; and
    restarting, by the master process, the application process in response to the detection of the catastrophic error while maintaining socket connection to the application process.

2. The method of claim 1, wherein the master process comprises a control thread configured to perform management of the upgrading of the code.

3. The method of claim 2, wherein the management of the upgrading of the code comprises opening domain socket server on which the application process will register, listening, by the listening socket, for all transfer control protocol connections, and processing a switchover control message.

4. The method of claim 1, wherein the master process is a stateful process.

5. The method of claim 1, wherein the application processes is a stateless process.

6. The method of claim 1, responsive to the variables, the master process is configured to pause information requests;

skipping read operations; and entering an application control of the application process prior to opening the master socket.

\* \* \* \* \*